United States Patent [19]

Michael et al.

[11] Patent Number: 4,936,180
[45] Date of Patent: Jun. 26, 1990

[54] APPARATUS FOR MACHINING WORKPIECES, PARTICULARLY FLAT CIRCULAR DISK-SHAPED SUBSTRATES

[75] Inventors: Klaus Michael, Gelnhausen-Haitz; Andreas Petz, Bruchkoebel, both of Fed. Rep. of Germany

[73] Assignee: Leybold Aktiengesellschaft, Hanau, Fed. Rep. of Germany

[21] Appl. No.: 295,232

[22] Filed: Jan. 9, 1989

[30] Foreign Application Priority Data

Nov. 5, 1988 [DE] Fed. Rep. of Germany ....... 3837688

[51] Int. Cl.$^5$ ................. B23B 13/10; B23B 15/00; B23Q 7/04; B25J 11/00
[52] U.S. Cl. .................................. 82/125; 82/1.12; 51/215 H
[58] Field of Search .............. 82/1.12, 122, 123, 125; 51/215 H

[56] References Cited

U.S. PATENT DOCUMENTS

| | | | |
|---|---|---|---|
| 1,428,716 | 9/1922 | Smith et al. | 51/215 H |
| 1,933,226 | 10/1933 | Smith et al. | 82/125 |
| 2,554,699 | 5/1951 | Gamble | 82/125 |
| 2,978,117 | 4/1961 | Thompson | 51/215 H |
| 4,060,937 | 12/1977 | Glazer | 51/215 H |
| 4,061,062 | 12/1977 | Peltier | 82/125 |
| 4,200,014 | 4/1980 | Dormehl | 82/125 |
| 4,235,136 | 11/1980 | Strausfeld | 82/1.12 |
| 4,264,254 | 4/1981 | Chang | 82/1.12 |
| 4,316,398 | 2/1982 | Link et al. | 82/125 |

FOREIGN PATENT DOCUMENTS

| | | |
|---|---|---|
| 180829 | 5/1986 | European Pat. Off. |
| 208828 | 1/1987 | European Pat. Off. |
| 3607588 | 3/1986 | Fed. Rep. of Germany |
| 225378 | 7/1985 | German Democratic Rep. |

OTHER PUBLICATIONS

Lundstrum, G., Industrial Robots-Gripper Review, Cotswold Press Ltd., Oxford, England (1978), p. 25.

Primary Examiner—William Terrell
Attorney, Agent, or Firm—Felfe & Lynch

[57] ABSTRACT

A lathe apparatus for machining flat, circular disk-shaped recording media, for example, audio, video or ROM compact disks, for the purpose of improving their surface quality and their dimensional stability is provided which comprises a driven lathe spindle (7), a vacuum chuck (8) for holding the recording medium or substrate (15, 15') to be machined, a carriage (9) for holding and guiding the tool (5), and magazines (14) for holding the machined and unmachined substrates. A robot (10) provided on the base (2) or bed (4) of the lathe comprises a gripper arm (11) with gripping tongs (12) movable in several planes which transports the substrates from one magazine (14) to the vacuum chuck (8) or from the vacuum chuck to the other magazine. The stacking axes (L) of the two magazines extend at an angle to the horizontal plane (E), and the magazines are maintained within the range of action of the gripper arm (11) with gripping tongs (12).

4 Claims, 2 Drawing Sheets

APPARATUS FOR MACHINING WORKPIECES, PARTICULARLY FLAT CIRCULAR DISK-SHAPED SUBSTRATES

BACKGROUND OF THE INVENTION

The invention relates to an apparatus for machining workpieces, particularly flat circular disk-shaped substrates, for the purpose of improving their surface quality and their dimensional stability. The apparatus comprises a lathe, a driven lathe spindle, a chuck for holding the substrate to be machined, a carriage for holding and guiding the tool, and magazines for holding the machined and unmachined substrates.

It is known to mold circular disk-shaped recording media, for example, audio, video or ROM compact disks, from a plastic and then to coat these moldings or substrates in a vacuum unit with a light-reflecting coating and to provide the latter in turn with a protective lacquer coating. Such disks have the drawback that their surface quality and shape retention only meet average requirements.

SUMMARY OF THE INVENTION

A principal object of the present invention is to provide an apparatus which, though of relatively simple construction, is adapted to machine fully automatically the surfaces of molded circular, disk-shaped substrates, so that their surface quality, accuracy of form and dimensional stability satisfy the most stringent requirements. Moreover, the apparatus is intended to cooperate with magazines in which the substrates are stacked.

The apparatus according to the invention is to provide assurance that the disk-shaped, thin substrates will not warp or otherwise become deformed while being machined. Furthermore, the apparatus is to cooperate for the transportation of the substrates with a robot that is of simple construction, whose task-performing steps are fixed-programmed, and which operates without measuring, locating or tactile sensing means.

In accordance with the invention, these objectives are accomplished by means of a robot held on the base or bed of the lathe having a gripper arm with gripper tongs movable in several planes, at least two stacking magazines being provided whose stacking axes extend at an angle to a horizontal plane and which are maintained within the range of action of the gripper arm with gripping tongs.

A special feature of the invention is an oblique positioning of the sender and receiver magazines, the so-called carriers. When the magazines are positioned horizontally, the disks (or substrates) to be handled are not in a well-defined position, which militates against sure-handed manipulation by the robot. The inventive handling concept in conjunction with the gripping tongs which grasps the substrates at their outer circumference (offcenter substrate pickup) and with the positioning precision made possible (without the use of a complicated exploring system that is prone to malfunction) by the work-holding cone of the vacuum chuck provides for extremely reliable operation.

The invention lends itself to a wide variety of implementation modes.

For a full understanding of the present invention, reference should now be made to the following detailed description of the preferred embodiment of the invention and to the accompanying drawings.

DESCRIPTION OF THE PREFERRED EMBODIMENT

Figure 1:
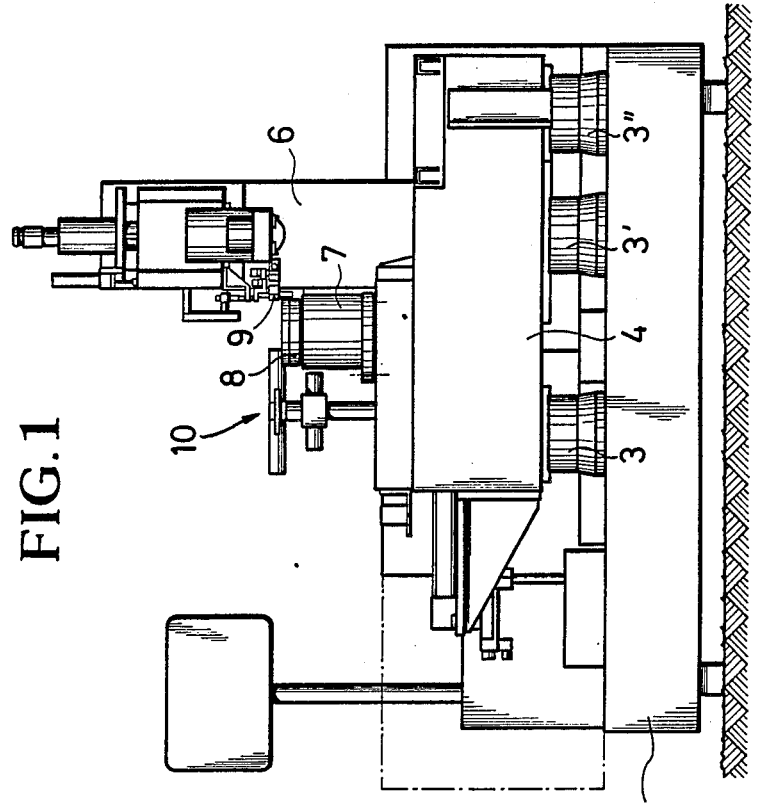
FIG. 1 is a side elevation of a diamond-tool lathe.
Figure 2:
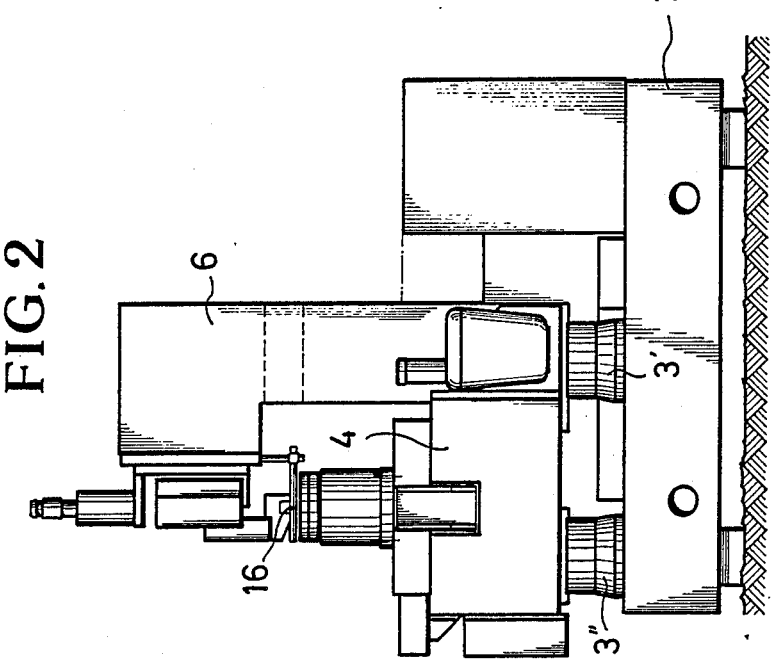
FIG. 2 is a further side elevation of the lathe of FIG. 1.

The lathe, shown considerably simplified in the drawings, essentially consists of a base 2 which supports, by means of three shock or vibration absorbers 3, 3', 3", the lathe bed 4 with the column 6 carrying the diamond cutting tool with the carriage 9 and the lathe spindle 7 with the vacuum chuck 8, there being further mounted on the lathe bed 4 a robot 10 with six axes and comprising a gripper arm 11 and gripping tongs 12, as well as two magazines 13, 14.

Figure 3:
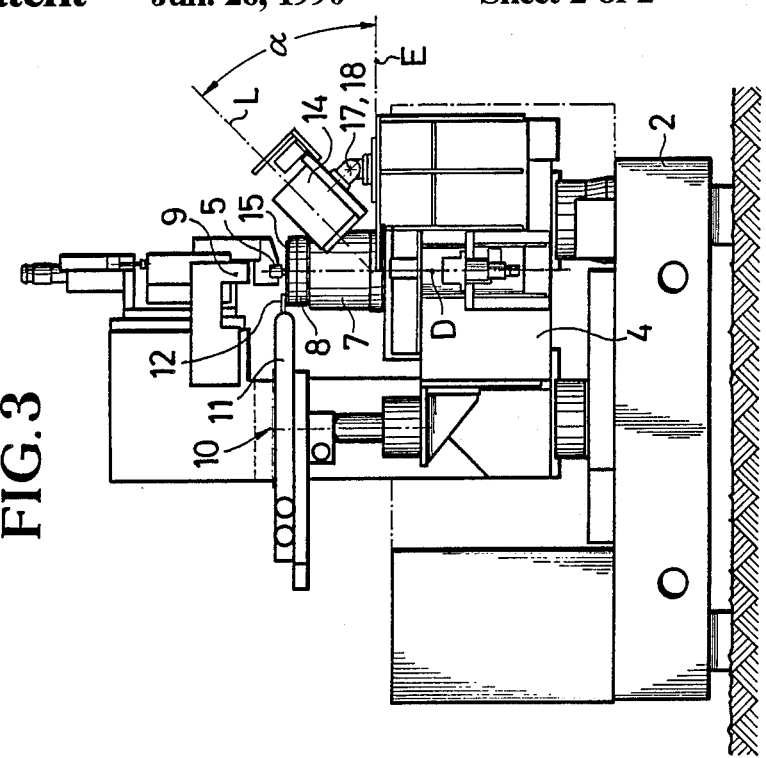
FIG. 3 is a third side elevation of the lathe of FIGS. 1 and 2.

A first magazine 14 and a second magazine 13 are held on the lathe bed 4 in such a way that their stacking or normal axes L, L' extend at an angle $\alpha$ of about 45 degrees to the horizontal plane E (FIG. 3). The magazines 13, 14 are filled with disk-shaped substrates 15, 15', which because of the inclined disposition of the magazines occupy a well-defined position therein since they all abut on the wall portions of one of the sides of a given magazine 13, 14. Note that the angle $(90°-\alpha)$ from the vertical must be sufficient for gravity to align the substrates against the wall portions, whereby the normal axes of the substrates are colinear.

Figure 4:
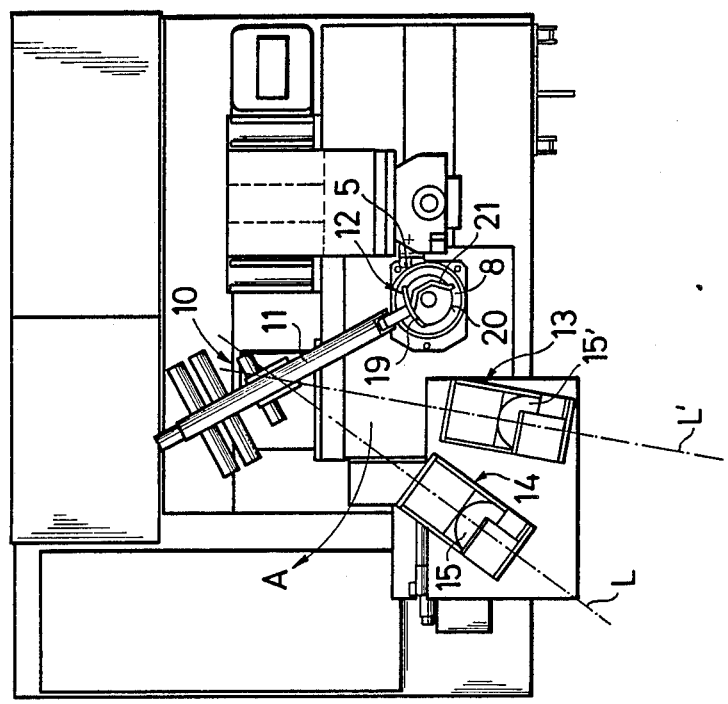
FIG. 4 is a plan view of the lathe of FIGS. 1 to 3.

The gripper arm 11 of the robot 10 at first pivots from the position shown in FIG. 4 in a direction of rotation indicated by the arrow A until its longitudinal axis is precisely aligned with the center or the stacking axis L of the magazine 14. The gripping tongs 12 then move out of the gripper arm 11 in its longitudinal direction until the gripping tongs 12 are in proximity to the uppermost circular disk-shaped substrate 15 in the magazine 14 and are able to grasp it.

The gripper means then picks up the substrate 15 from the first magazine 14, pivots counter to the direction of the arrow A until the longitudinal axis of the gripper arm 11 intersects the axis of rotation D of the lathe spindle 7, and deposits the substrate 15 on the vacuum chuck 8, where the substrate 15 is held by the suction pressure acting on its underside. A measuring tactile sensor 16 mounted on the column 6 then moves up to the substrate 15 and determines the thickness of that circular disk-shaped substrate. The lathe spindle 7 is then set into rotation by means of a motor, not shown in detail, with the carriage 9 guiding the diamond cutting tool 5 radially across the substrate 15, a chip of a given thickness being so removed. (The depth of cut is equal to one-half the measured or sensed deviation from the desired thickness of the substrate.) After one side of the substrate 15 has been lathed, the substrate is grasped by the gripper arm 11 moving forward from a rear position, picked up from the carriage 9, turned 180 degrees, and laid by its already machined side on the vacuum chuck 8. The diamond cutting tool 5 then again moves across the substrate 15, turning the second side. Finally the gripping tongs 12 pick up the substrate 15 from the chuck 8 and deposit it in the second magazine 13, with the gripper arm 11 lining up with the axis L'.

The robot 10 is of relatively simple construction since it is able to operate with fixed-programmed settings because of the inclined position of the magazines 13 and 14, the high precision of the substrates 15, 15' (particularly with respect to their outside diameter), and the precise position of the vacuum chuck 8. (It is apparent that under these conditions all disk-shaped substrates 15, 15' first have to be precision-machined with respect to their outside diameter so that the gripping tongs 12 can find, grasp and hold the substrate every time without fail.

To this end, the gripping tongs 12 consist of a roughly arcuate bow 19 provided at its free ends with notches or bosses which cooperate with the peripheral edge of the substrate 15, 15', and of a displaceable finger 21 which grasps the opposite edge of the substrate.

It should be noted that the substrates 15, 15' machined on the apparatus described are distinguished by far better dimensional stability, especially with regard to thickness, and far better surface quality and shape retention than conventional substrates produced merely by molding, and that they are therefore suitable for use particularly as optical recording media, for example, as high-quality audio, video or ROM compact disks.

Moreover, it should be noted that only a diamond-tool lathe can be used which meets the most stringent requirements with regard to precision, preferably one that is equipped with an air-bearing spindle 7 and with a massive bed 4 of granite.

Finally, a considerable advantage of the apparatus described is that it operates fully automatically and picks up the substrates 15, 15' one after the other from a first magazine 14 and after machining them deposits them in a similar magazine 13, so that the magazines can be replaced without any downtime of the lathe.

There has thus been shown and described a novel apparatus for machining workpieces which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

We claim:

1. Lathe apparatus for machining the planar surfaces of disk-shaped substrates, comprising
    a lathe base
    a driven lathe spindle on said base, said spindle having a vertical axis,
    a chuck arranged on said spindle for holding the substrate to be machined and rotating it about its normal axis,
    a carriage arranged on said base for holding and guiding a machine tool relative to a substrate held by said chuck,
    a robot arm with substrate gripping means for moving said substrate in several planes, said arm being rotatable about a vertical axis to carry the substrate through a range of action which includes said chuck, so as to supply substrates to be machined to said chuck and to remove machined substrates from said chuck,
    a first magazine for holding a stack of the disk-like substrates to be machined with their normal axes at an acute angle from the vertical which is sufficient to align the substrates against a wall portion of the first magazine so that said axes are colinear and constitute the stacking axis of said magazine, said first magazine being within the range of action of said gripper arm to supply said substrates to be machined to said gripper arm, and
    a second magazine for holding a stack of disk-like substrates after machining with their axes at an acute angle from the vertical which is sufficient to align the substrates against a wall portion of the second magazine so that said axes are colinear and constitute the stacking axis of said magazine, said second magazine being within the range of action of said gripper arm to receive said substrates after machining from said gripper arm.

2. The apparatus defined in claim 1, wherein the stacking axes of said magazines make an angle of about 45 degrees with the horizontal.

3. The apparatus defined in claim 1, wherein said magazines are adjustable with respect to both their inclination to the horizontal and their spacing from the lathe spindle.

4. The apparatus defined in claim 1, wherein the gripping means comprises gripping tongs comprise a bow for holding the peripheral edge of one side of a substrate and a finger, movable relative thereto, for holding the opposite peripheral edge of the substrate.

* * * * *